United States Patent
Hoerl, Jr. et al.

(10) Patent No.: US 8,291,855 B2
(45) Date of Patent: Oct. 23, 2012

(54) MOBILE ROBOT PRINTER FOR LARGE IMAGE REPRODUCTION

(76) Inventors: Jeffrey Joseph Hoerl, Jr., Roswell, GA (US); Arthur Cranwell Boensch, III, Summerville, SC (US)

( * ) Notice: Subject to any disclaimer, the term of this patent is extended or adjusted under 35 U.S.C. 154(b) by 742 days.

(21) Appl. No.: 12/321,276

(22) Filed: Jan. 16, 2009

(65) Prior Publication Data

US 2010/0182356 A1    Jul. 22, 2010

(51) Int. Cl.
*B05B 3/00* (2006.01)
*B05B 5/00* (2006.01)

(52) U.S. Cl. ........ 118/323; 118/712; 118/679; 118/681; 239/752

(58) Field of Classification Search ................. 118/300, 118/313–315, 323, 321, 712, 713, 679–681; 347/2, 8; 400/29, 30, 88; 239/752
See application file for complete search history.

(56) References Cited

U.S. PATENT DOCUMENTS

| | | | |
|---|---|---|---|
| 5,453,931 A * | 9/1995 | Watts, Jr. | 701/23 |
| 6,467,978 B1 | 10/2002 | Tideman, Jr. | |
| 6,951,375 B2 | 10/2005 | Patton et al. | |
| 7,093,923 B2 * | 8/2006 | Silverbrook et al. | 347/40 |
| 7,148,644 B2 | 12/2006 | Yourlo et al. | |
| 7,213,985 B1 * | 5/2007 | Chen | 400/29 |
| 2007/0062383 A1 * | 3/2007 | Gazeau et al. | 101/35 |

FOREIGN PATENT DOCUMENTS

WO    WO 03/082418 A1    10/2003

* cited by examiner

*Primary Examiner* — Yewebdar Tadesse
(74) *Attorney, Agent, or Firm* — Timothy J. Monahan; Monahan & Moses, LLC

(57) ABSTRACT

A system for automatically reproducing an image on a large surface, such as the surface of an outdoor or indoor athletic field or athletic court. The system includes a computer, a microcontroller, a mobile robotic platform, a plurality of distance sensors, a plurality of boundary markers, and image reproduction machinery. The computer takes the image input by the user and translates for use by the microcontroller. The distance sensors use the boundary markers to provide positioning information to the microcontroller. The microcontroller is used to control motors and sensors on the mobile robotic platform and image reproduction machinery. The mobile robotic platform propels and steers the system along the surface. The image production machinery comprises a guide rail, a carriage, and a paint head assembly which reproduce the image onto a large surface. The movement of the image production machinery is decoupled from the movement of the mobile robotic platform.

20 Claims, 3 Drawing Sheets

MOBILE ROBOT PRINTER FOR LARGE IMAGE REPRODUCTION

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of Invention

This invention relates to a system for reproducing an image on a large surface, the image being downloaded into a computer program which automatically operates image producing equipment and a mobile robotic platform which transports said image producing equipment over the large surface to reproduce the image thereon.

Athletic field painting is a large and growing industry. In almost every level of athletics there is a need to personalize athletic fields to a particular team name, logo, or mascot as well as provide income to athletic programs through the placement of advertisements on the athletic fields. The process of printing, cutting, and labeling stencils and having multiple individuals paint through the stencils onto the athletic field surface is a very costly in time, money, and wasted materials. An alternative method of diving the athletic field surface into grids and hand-painting each grid at a larger scale than the original image likewise is very expensive in time, money, and wasted materials. What is needed is an automated system that does not require a large stencil, gridlines, or significant manpower investment to reproduce an image, text, or graphic onto an athletic field surface in an enlarged state. Also, such a system should be adaptable so that any image, text or graphic may be reproduced in any size, oriented in any direction, on smooth or textured surfaces, or selectively modified to accommodate holes or structures on the surface.

2. Prior Art

Wales Patent Application No. 0207107.4 entitled TURF IMAGE MARKER and dated 17 Feb. 2003 shows an example of an automated machine that is designed to perform a number of tasks including the painting of an image onto an athletic field. This invention though similar in purpose attempts to solve the problem of athletic field painting in a different manner. Firstly, the TURF IMAGE MARKER does a variety of tasks which do not relate to the reproduction of an image which increase the weight and power consumption of the machine. A key idea within my design is that this mobile robot should be as light as possible as the turf used in the athletics industry is well-manicured and easily damaged. Secondly, the TURF IMAGE MARKER does not decouple the locomotion means from the image marking means. By not decoupling these two independent systems the accuracy of the image marking means is significantly dependent on the accuracy of the locomotion means of the machine. Exact positioning of the image marking means of the TURF IMAGE MARKER will require constant movement and position correction of the entire TURF IMAGE MARKER including the components which are not used for image marking purposes. Our design decouples the image reproduction means from the mobile robot platform through the use of a painting arm which connects to the mobile robot platform. The mobile robot platform will then move to a given position within an acceptable threshold from the desired position and the painting arm is then able to adjust squarely to the orientation of the image to be painted and paint a rectangular subset of the image without needing to move the mobile robot platform during this operation. This decoupling saves time as the paint arm is able to more accurately and quickly adjust to the proper orientation and positioning desired. Also, this decoupling saves significant power consumption that is necessary to constantly move the entire mobile robot platform as the weight of the platform is much greater and much more difficult to position accurately without numerous adjustments. Thirdly, the TURF IMAGE MARKER allows for each color within the marking system to map to each spray nozzle. Our mobile robot platform will consist of a plurality of paint colors each contained individually and connected to a single paint head to maintain the color purity. Whereas the TURF IMAGE MARKER has the spray nozzles mounted in a linear fashion, our paint head assembly has a plurality of paint heads mounted on a rotating ring in a circular fashion with means to rotate a given color to the active painting position which corresponds to a given position within the image to be reproduced. Fourthly, our design of the painting assembly allows for the paint head to be raised and lowered in relation to the painting surface in order to increase and decrease the granularity of painting and thereby increase and decrease the resolution of the image being reproduced.

U.S. Pat. No. 6,467,978 entitled LARGE SURFACE IMAGE REPRODUCTION SYSTEM and dated 22 Oct. 2002 shows a machine that is able to reproduce large images onto billboards and the sides of buildings. This machine is not intended for use on athletic fields or other ground or floor surfaces and does not provide means for large image reproduction on such surfaces.

U.S. Pat. No. 7,148,644 entitled MARKING ROBOT and dated 12 Dec. 2006 shows a machine that marks a surface using coded data found on the surface. This machine is not intended for use on athletic fields or other ground or floor surfaces and does not provide means for large image reproduction on such surfaces.

U.S. Pat. No. 6,951,375 entitled LARGE AREA MARKING DEVICE AND METHOD FOR PRINTING and dated 4 Oct. 2005 shows a marking machine using a scanner and able to reproduce large images onto a sidewalk or other surface. This machine is not intended to reproduce large images with accuracy and our painting assembly does not contain image manipulation ability and simply uses an image which has been downloaded along with the base software of the mobile robot.

SUMMARY OF THE INVENTION

It is an object of the present invention to provide a system for reproducing any desired image, text or graphic on a large surface, such as an athletic field, athletic court, or paved surface. It is another object of the present invention to provide such a system that can reproduce an exact image, text or graphic in any direction, size, or textured surface.

It is a further object of the present invention to provide such a system that is more economical and efficient to use than current methods used in the athletic field painting industry.

These and other objects are met by a system for reproducing any desired image, text or graphic on a large surface, such as an athletic field or athletic court. The system includes a computer, a microcontroller, a mobile robotic platform, a plurality of distance sensors, a plurality of boundary markers, and image reproduction machinery. The computer is designed to take the image input by the user and translates for use by the microcontroller. The distance sensors use the boundary markers to provide positioning information to the microcontroller which then aligns the field dimensions to the image dimensions. The microcontroller is used to control motors and sensors on the mobile robotic platform and image reproduction machinery. The mobile robotic platform propels and steers the system along the surface taking direction from the microcontroller. The image production machinery comprises a guide rail, a carriage, and a paint head assembly which reproduce the image onto a large surface. The movement of the image production machinery is decoupled from the movement of the mobile robotic platform providing fast and accurate positioning of the paint head above the surface position which aligns with the portion of the image to be painted onto the athletic surface.

In the drawings which form a part of this specification,

DETAILED DESCRIPTION OF THE INVENTION

Figure 1:
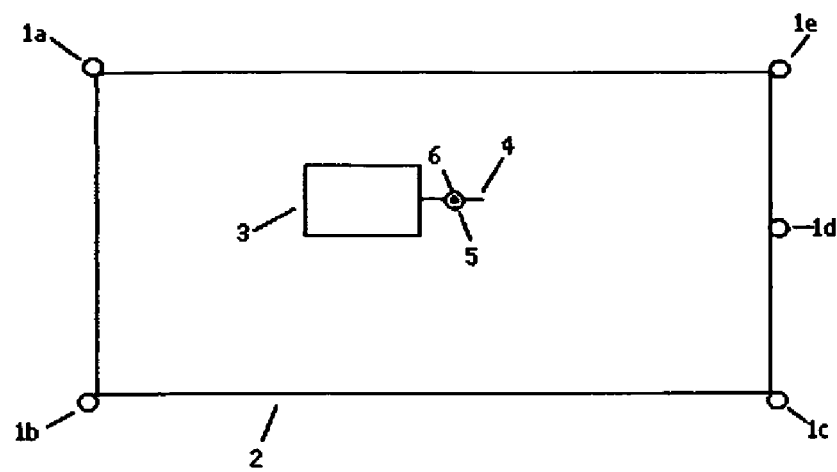
FIG. 1 is an aerial view of the portion of the athletic field on which the invention will reproduce the image.

FIG. 1 shows an aerial view of the athletic surface 2 on which the image will be reproduced at a larger scale using the mobile robot large image reproduction system 3. One or more sonar, laser, or other type positioning range sensor 6 located on the paint head assembly 5 uses reflectors 1 which are positioned around the image border to constantly provide location information.

Figure 2:
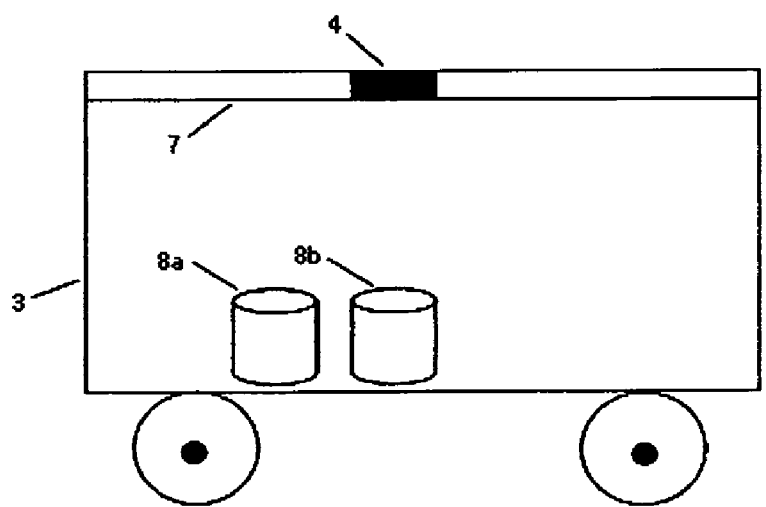
FIG. 2 is a side view of the invention.

FIG. 2 shows a side view of the mobile robot large image reproduction system 3 including the guide rail 7 which allows the paint arm 4 to move in the direction of the length of the mobile robot platform 3. A plurality of pressurized paint cylinders represented by 8a and 8b are located in the base of the mobile robot 3 to offset the weight of the paint arm 4 and provide medium to the respective plurality paint heads.

Figure 3:
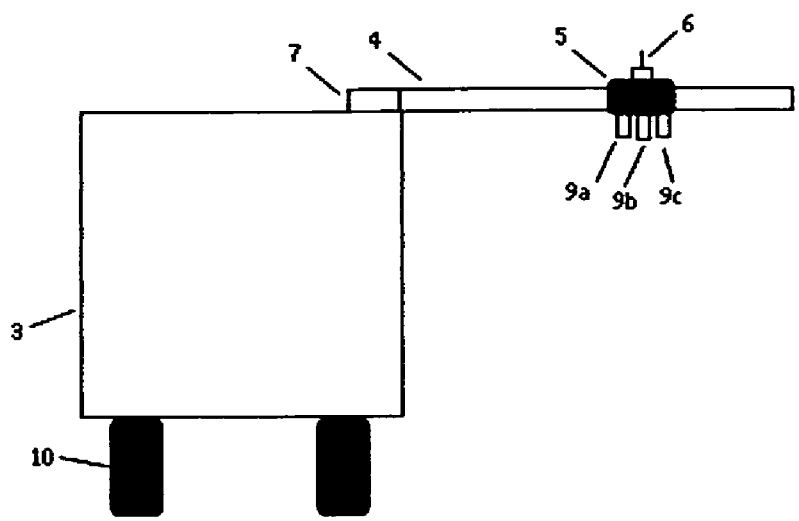
FIG. 3 is a rear view of the invention.

FIG. 3 shows a rear view of the mobile robot large image reproduction system 3. The mobile robot is propelled by wheels or tracks 10 located on the base of the mobile robot platform. The paint arm 4 holds a plurality of paint heads 9. One or more sonar, laser, or other type positioning range sensor 6 is located on the paint head assembly 5 above the active paint head 9b.

Figure 4:
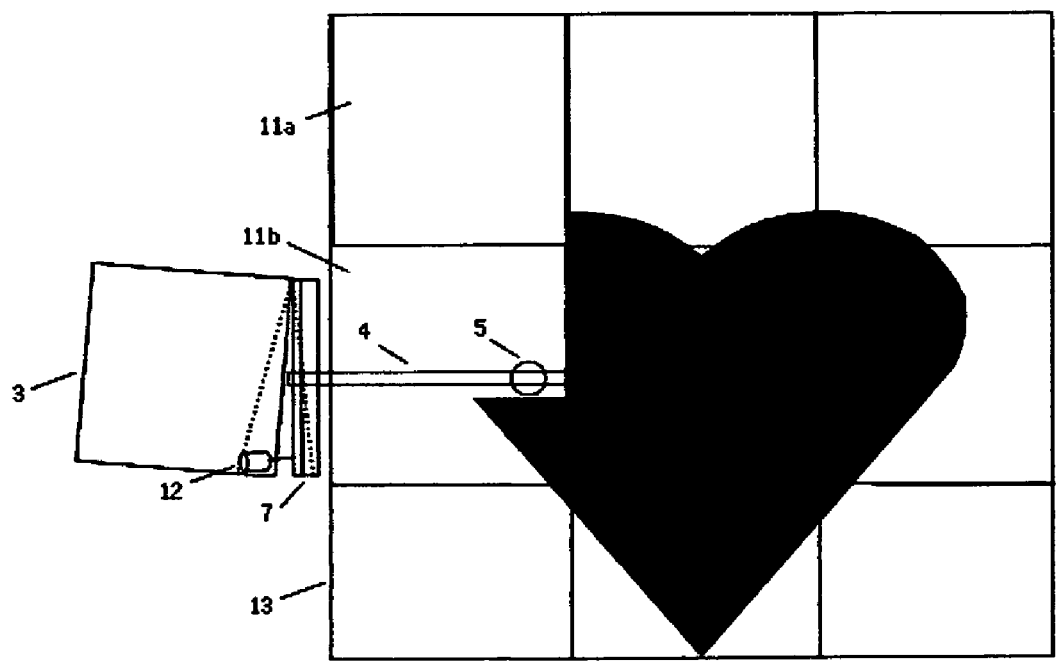
FIG. 4 is an aerial view of the athletic field to be painted and the invention.

FIG. 4 shows the ability of the guide rail angle adjuster 12 to accurately align the guide rail 7 squarely to the image to be painted 13 despite positioning error of the mobile robot platform 3. Once the robot comes within some threshold of the desired painting position the guide rail 7 is positioned squarely in relation to the orientation of the image to be painted 13 using guide rail angle adjuster 12 such that repositioning of the entire mobile robot is not necessary and to achieve greater accuracy with less time and energy. Once squarely aligned to the orientation of the image the paint arm 4 moves along guide rail 7 to provide the x axis movement of the paint head assembly 5. The paint head assembly 5 moves along the guide rail 7 in a direction perpendicular to the movement of the paint arm 4 to provide y axis movement of the paint head assembly 5. Each painting position 11 represents the area the mobile robot large image reproduction system is able to paint using the paint arm 4 which moves along the guide rail 7 without having to move the mobile robot platform 3. The size of each painting position 11 will depend on the length of the guide rail 7, the length of the paint arm 4, the size of the image to be painted 13, and the adjustment necessary by the guide rail angle adjuster 12. While located at each painting position, the image to be reproduced 13 will be painted one color at a time with the robot moving to the next painting position 11a following the completion of all painting of all colors for the current painting position 11b. This method saves time and power consumption by limited movement of the entire mobile robot platform 3 as well as limited rotation of the paint head assembly 5.

Figure 5:
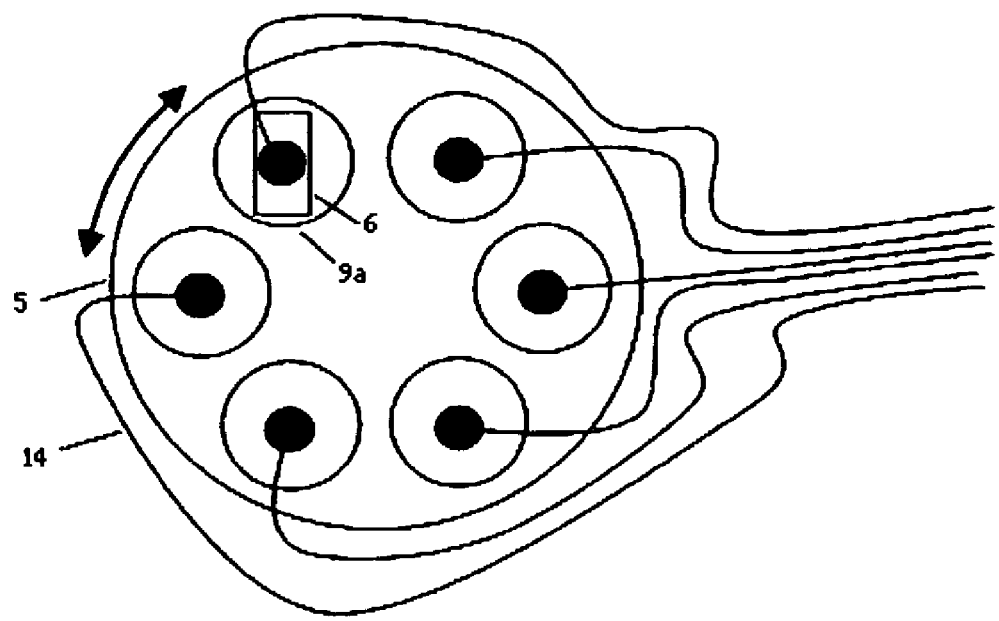
FIG. 5 is an aerial view of the paint head assembly.

FIG. 5 shows the paint head assembly 5 which consists of a plurality of paint heads 9 as well as the range sensor 6 which rests above the active paint head 9a. The paint head assembly 5 is able to rotate in either direction using electric motors controlled by the microcontroller such that a desired color can be selected by rotating the respective paint head to the active painting position. The ability to move the paint head assembly 5 in either direction prevents the tangling of paint lines 14 which run from a paint head 9 to the respective pressurized paint cylinders 8 located on the mobile robot platform 3. Each paint color is connected by a unique paint line 14 to a paint head 9 such that the purity of the color is preserved.

Figure 6:
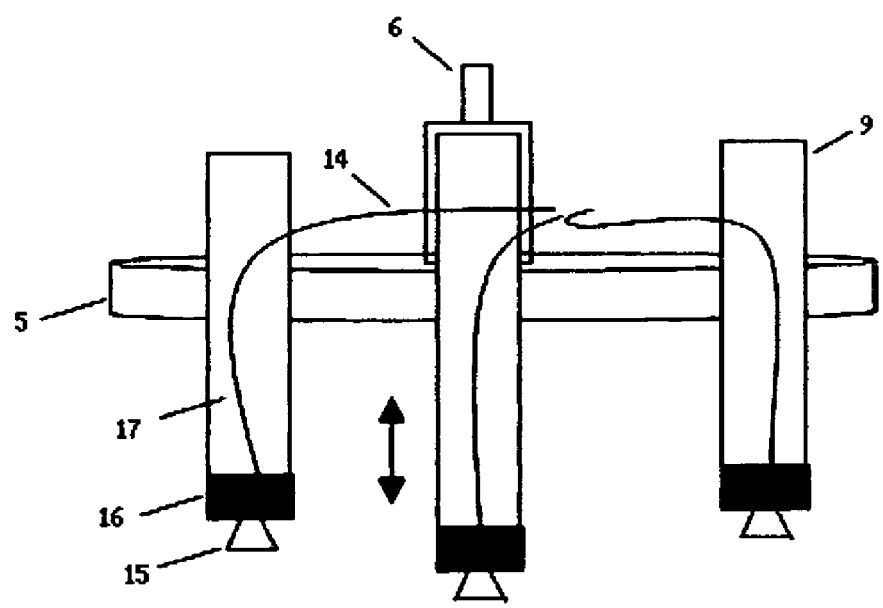
FIG. 6 is a side view of the paint head assembly.

FIG. 6 shows the paint head assembly 5 which consists of a plurality of paint heads 9. A paint head 9 consists of a spray nozzle 15, a control valve 16, and a connection bar 17 which can be raised and lowered in relation to paint head assembly 5 thereby increasing and decreasing the paint head's distance from the surface to be painted. This raising and lowering of connection bar 17 allows for a decrease and increase in image resolution due to the decrease and increase in area coverage by the paint head. Paint line 14 provides medium to be applied by the spray nozzle 15 onto the surface to be painted.

What is claimed is:

1. An image reproduction system, for painting an image on a surface, comprising:
    (a) a mobile robotic platform;
    (b) image reproduction machinery, comprising a guide rail mounted on the robotic platform, an arm mounted on and extending outward from the guide rail, whereby the arm is moveable along the guide rail, and a paint head assembly mounted on the arm, whereby the paint head assembly is moveable along the arm, and the image reproduction machinery is configured to provide movement of the paint head assembly in both the x axis and y axis of a plane overlaying the surface to be painted, independent of the movement of the robotic platform;
    (c) a plurality of motors for controlling movement of the mobile robotic platform, movement of the arm along the guide rail and movement of the paint head assembly along the arm;
    (d) a plurality of paint reservoirs positioned on the robotic platform and connected to the paint head assembly; and
    (e) a microcontroller for controlling the motors and operation of the paint head assembly.

2. The image reproduction system of claim 1, further comprising a plurality of boundary markers positioned on the surface to be painted and a positioning sensor located on the mobile robotic platform or image reproduction machinery, whereby the positioning sensor provides positioning information of the mobile robotic platform or the image reproduction machinery for use by the microcontroller.

3. The image reproduction system of claim 2, wherein the sensor is positioned on the paint head assembly.

4. The image reproduction system of claim 1, wherein the arm extends perpendicularly from the guide rail and parallel to the surface to be painted.

5. The image reproduction system of claim 1, further comprising a guide rail angle adjuster mounted on the robotic platform and connected to the guide rail for adjusting the orientation of the guide rail relative to the robotic platform and the surface to be painted, whereby the guide rail is pivoted parallel to the surface.

6. The image reproduction system of claim 1, wherein the robotic platform is propelled by a plurality of wheels.

7. The image reproduction system of claim 1, wherein the paint head assembly is rotatably mounted on the arm, such that the paint head assembly can rotate in either direction.

8. The image reproduction system of claim 1, wherein the paint head assembly comprises a plurality of nozzles, with each nozzle connected to one of the paint reservoirs.

9. The image reproduction system of claim 1, wherein the paint head assembly comprises a nozzle and the nozzle is adjustable vertically to vary the distance from the surface to be painted.

10. The image reproduction of claim 1, further comprising a computer for receiving input of an image to be reproduced and communicating with the microcontroller.

11. The image reproduction system of claim 1, wherein the microcontroller comprises image data for controlling the image reproduction machinery and the motors.

12. An image reproduction system, for painting an image on a surface, comprising:
    (a) a self-propelled, mobile, robotic platform;
    (b) image reproduction machinery, comprising a guide rail mounted on the robotic platform, an arm mounted on and extending outward from the guide rail, whereby the arm is moveable along the guide rail, and a paint head assembly mounted on the arm, whereby the paint head assembly is moveable along the arm, and the image reproduction machinery is configured to provide movement of the paint head assembly in both the x axis and y axis of a plane overlaying and parallel to the surface to be painted, independent of the movement of the robotic platform;
    (c) a plurality of motors for controlling movement of the mobile robotic platform, movement of the arm along the guide rail and movement of the paint head assembly along the arm, wherein the motors are supported by the robotic platform;
    (d) a plurality of pressurized paint reservoirs positioned on the robotic platform and connected to the paint head assembly;
    (e) a microcontroller for controlling the motors and operation of the paint head assembly, supported by the robotic platform; and
    (f) a plurality of boundary markers positioned on the surface to be painted and a positioning sensor located on the mobile robotic platform or image reproduction machinery, whereby the positioning sensor provides positioning information of the mobile robotic platform or the image reproduction machinery for use by the microcontroller.

13. The image reproduction system of claim 12, wherein the boundary markers are reflectors and the positioning sensor is positioned on the paint head assembly.

14. The image reproduction system of claim 12, further comprising a guide rail angle adjuster mounted on the robotic platform and connected to the guide rail for adjusting the orientation of the guide rail relative to the robotic platform and the surface to be painted, whereby the guide rail is pivoted parallel to the surface.

15. The image reproduction system of claim 12, wherein the paint head assembly comprises a plurality of nozzles, with each nozzle connected to one of the paint reservoirs and the nozzles are adjustable vertically to vary the distance from the surface to be painted.

16. The image reproduction system of claim 12, wherein the arm extends perpendicularly from the guide rail and parallel to the surface to be painted.

17. The image reproduction of claim 12, further comprising a computer for receiving input of an image to be reproduced and communicating with the microcontroller.

18. The image reproduction system of claim 12, wherein the robotic platform is propelled by a plurality of wheels.

19. The image reproduction system of claim 12, wherein the paint head assembly is rotatably mounted on the arm, such that the paint head assembly can rotate in either direction.

20. The image reproduction system of claim 12, wherein the microcontroller comprises image data for controlling the image reproduction machinery and the motors.

* * * * *